(12) United States Patent
Pedretti

(10) Patent No.: US 12,090,724 B2
(45) Date of Patent: Sep. 17, 2024

(54) SYSTEM AND METHOD FOR MAKING A BLOCK FOR GRAVITY ENERGY STORAGE

(71) Applicant: Energy Vault, Inc., Westlake Village, CA (US)

(72) Inventor: Andrea Pedretti, Thousand Oaks, CA (US)

(73) Assignee: Energy Vault, Inc., Westlake Village, CA (US)

( * ) Notice: Subject to any disclaimer, the term of this patent is extended or adjusted under 35 U.S.C. 154(b) by 0 days.

(21) Appl. No.: 18/594,424

(22) Filed: Mar. 4, 2024

(65) Prior Publication Data

US 2024/0198619 A1   Jun. 20, 2024

(51) Int. Cl.
| | |
|---|---|
| *B30B 11/26* | (2006.01) |
| *B29C 43/54* | (2006.01) |
| *B30B 11/00* | (2006.01) |
| *B30B 11/02* | (2006.01) |

(52) U.S. Cl.
CPC ............ *B30B 11/26* (2013.01); *B29C 43/54* (2013.01); *B30B 11/007* (2013.01); *B30B 11/02* (2013.01)

(58) Field of Classification Search
CPC ..... B30B 9/301; B30B 9/3014; B30B 9/3078; B30B 9/3096; B30B 11/005; B30B 11/02; B30B 11/007; B30B 11/26; B30B 15/06; B30B 15/062; B30B 15/065; B29C 43/54
See application file for complete search history.

(56) References Cited

U.S. PATENT DOCUMENTS

| | | | | |
|---|---|---|---|---|
| RE35,506 E | * | 5/1997 | Solazzi ................ | B30B 11/005 425/149 |
| 5,694,742 A | * | 12/1997 | Elliott ................... | B30B 9/3078 53/529 |
| 6,347,931 B1 | * | 2/2002 | Underwood .......... | B30B 9/3096 425/62 |
| 2005/0202115 A1 | * | 9/2005 | Williamson .......... | B30B 15/065 425/315 |

FOREIGN PATENT DOCUMENTS

CN    115122469 A    9/2022

* cited by examiner

*Primary Examiner* — Thu Khanh T. Nguyen
(74) *Attorney, Agent, or Firm* — Knobbe Martens Olson & Bear LLP

(57) ABSTRACT

A system for making blocks for gravity energy storage includes an extrusion press machine with a receiving chamber for receiving raw material, a compaction chamber and a pressing wall driven by a piston to push the raw material into the compaction chamber to compact the material to form a block. One or more of a top wall, opposite side walls and the pressing wall are moved away from the a center of the compaction chamber to allow the block to elastically expand prior to exiting the compaction chamber.

18 Claims, 16 Drawing Sheets

SYSTEM AND METHOD FOR MAKING A BLOCK FOR GRAVITY ENERGY STORAGE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is directed to a system and method for making a block, and more particularly to a system and method for making a block for gravity energy storage.

Description of the Related Art

Some gravity energy storage systems consists of moving solid weights between a lower elevation and a higher elevation to store energy based on the potential energy in the block or generate electricity based on the lowering of the weight. Existing systems and methods of forming blocks are inadequate in that the formed blocks fail as soon as they are formed. For example, existing systems for compacting material to form a block in a press and then push the block out of the press as soon as it is formed results in blocks that fail (e.g., crack) as soon as they are pushed out of the press.

SUMMARY

There is a need for an improved system and method of manufacturing blocks for gravity energy storage that simplifies the process of making the blocks and improves the reliability of the blocks.

In accordance with one aspect of the disclosure, a system for making blocks for gravity energy storage includes an extrusion press machine with a receiving chamber for receiving raw material, a compaction chamber, and a pressing wall driven by a piston to push the raw material into the compaction chamber to compact the material to form a block. Following the forming of the block, the block is allowed to expand in three dimensions within the compaction chamber before the block is moved out of the compaction chamber of the extrusion press machine.

In accordance with one aspect of the disclosure, a system for making blocks for gravity energy storage includes an extrusion press machine with a receiving chamber for receiving raw material, a compaction chamber and a pressing wall driven by a piston to push the raw material into the compaction chamber to compact the material to form a block. One or more of a top wall of the compaction chamber, opposite side walls of the compaction chamber and the pressing wall (e.g., all three of the top wall, the opposite side walls and the pressing wall), are moved away from a center of the compaction chamber after the block is formed to allow the block to expand in three dimensions prior to exiting the compaction chamber.

In some aspects, the techniques described herein relate to a system for making blocks for gravity energy storage, including: an extrusion press machine including a receiving chamber configured to receive material for forming a block, a compaction chamber in communication with the receiving chamber, the compaction chamber including a base, a pair of opposite sidewalls and a top wall, a gate operable to open or close a distal end of the compaction chamber, and a piston actuatable to slidably move a pressing wall across the receiving chamber and into the compaction chamber with the gate in a closed position to press the material into contact with the gate, the pair of opposite sidewalls, the top wall, the pressing wall and a plate positioned on a base wall of the compaction chamber in order to compact the material within the compaction chamber to form a block, wherein one or more of the pair of opposite sidewalls, the top wall and the pressing wall are operable to move away from a center of the compaction chamber to allow the block to elastically expand to an expanded position while positioned on the plate and prior to exiting from the compaction chamber, and wherein the gate is operable to open the distal end of the compaction chamber to allow the block in the expanded position to exit the compaction chamber.

In some aspects, the techniques described herein relate to a system for making blocks for gravity energy storage, including: an extrusion press machine including a receiving chamber configured to receive material for forming a block, a compaction chamber in communication with the receiving chamber, the compaction chamber including a base, a pair of opposite sidewalls and a top wall, a gate operable to open or close a distal end of the compaction chamber, a piston actuatable to slidably move a pressing wall across the receiving chamber and into the compaction chamber with the gate in a closed position to press the material into contact with the gate, the pair of opposite sidewalls, the top wall and the pressing wall to compact the material within the compaction chamber to form a block, and means for moving the pair of opposite sidewalls and the top wall toward or away from a center of the compaction chamber to allow the formed block to elastically expand prior to exiting the compaction chamber.

In some aspects, the techniques described herein relate to a method of making a block for gravity energy storage, including: at least partially filling a receiving chamber of an extrusion press machine with material including dirt and one or more additives or binding agents; moving the material with a pressing wall into a compaction chamber of the extrusion press machine; compacting the material within the compaction chamber between a gate, a pair of opposite sidewalls, a top wall and the pressing wall to form the block; moving the pair of opposite sidewalls, the top wall and the pressing wall away from a center of the compaction chamber to allow the formed block to elastically expand in size in three dimensions; and moving the gate to open a distal end of the compaction chamber to allow the expanded block to exit the extrusion press machine.

DETAILED DESCRIPTION

Figure 9:
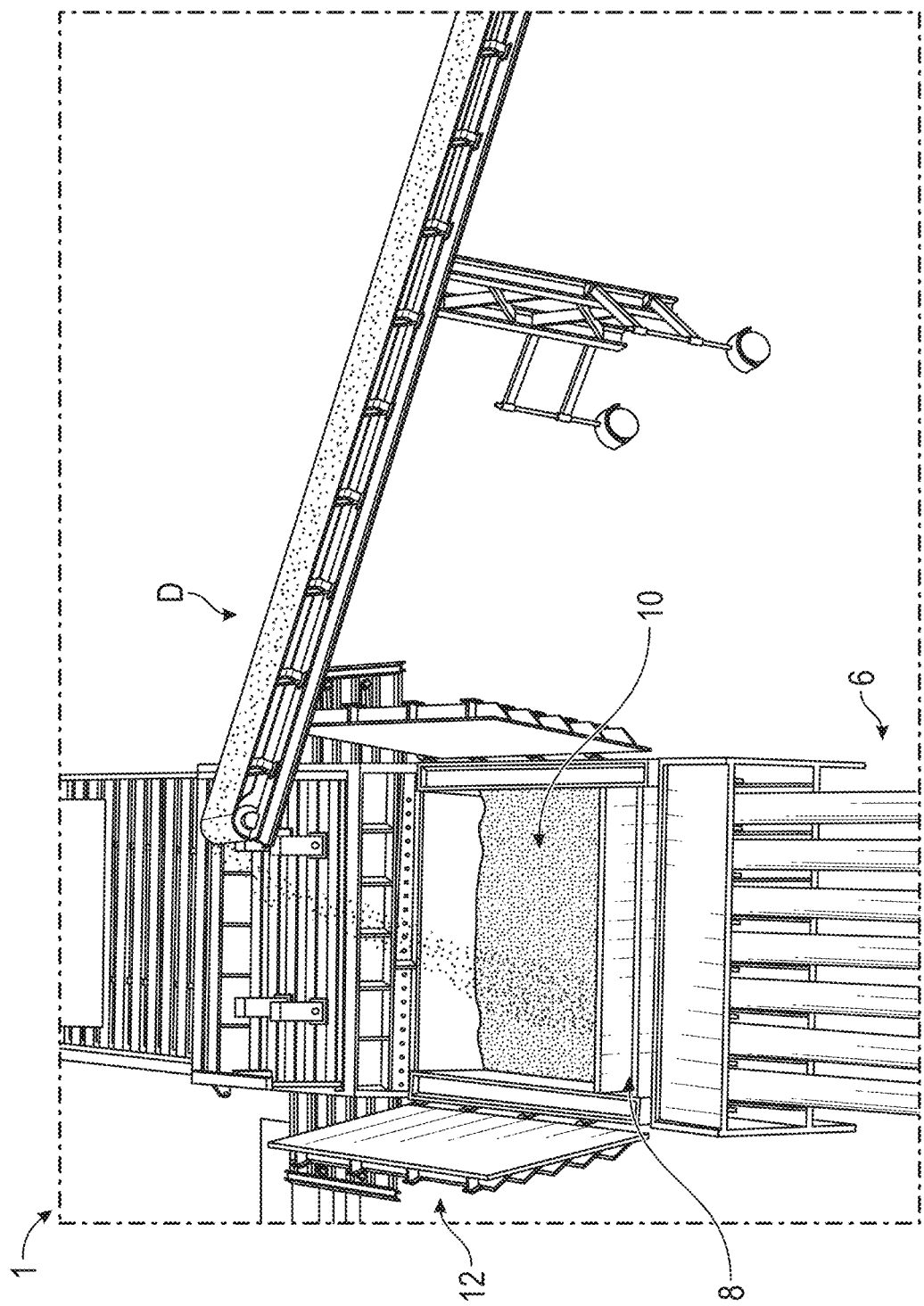
FIG. 9 is a partial perspective view of a block extrusion press machine receiving material for forming a block.

FIGS. 1-9 shows a system 1 for forming a block for gravity-based energy storage. In one example, the system 1 is or includes an extrusion press machine 1. The extrusion press machine 1 extends from a proximal end 2 to a distal end 4 and has a receiving chamber 10 for receiving (raw) material M (via a dispenser D, such as a conveyor, see FIGS. 8-9) for making a block B, which in some examples can include dirt, one or more additives and/or one or more binding agents. However, the material can include other suitable substances for making a block B (e.g., cement). One or more (e.g., a pair of) doors 12 can extend over the receiving chamber 10. The door(s) 12 can be actuated by one or more (e.g., a pair of) pistons 14 to move between an open position (see FIGS. 8-9) to allow material M to enter the receiving chamber 10 (and fill the receiving chamber 10, as shown in FIG. 9) and a closed position (see FIG. 1-4) to close the receiving chamber 10. Optionally, a hopper 15 can extend above the receiving chamber 10 and facilitate (e.g., aid in) directing the material into the receiving chamber 10.

Figure 1:
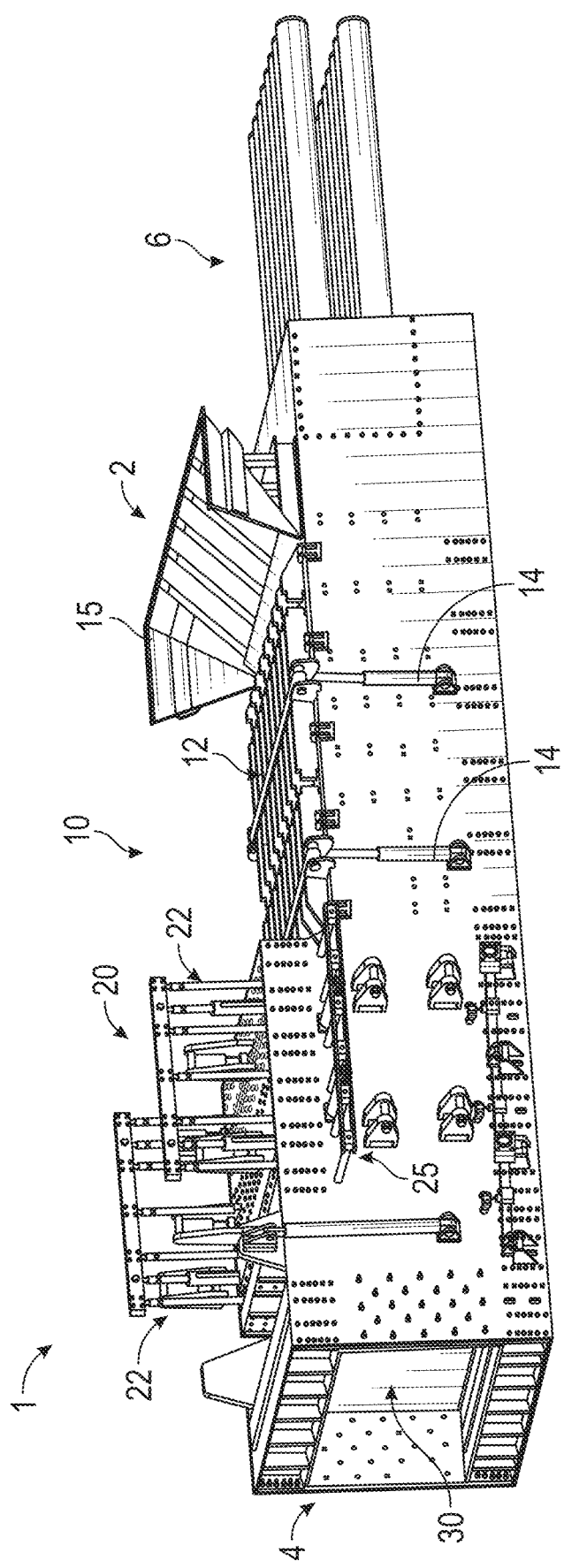
FIG. 1 is a perspective view of a block extrusion press machine.
Figure 2:
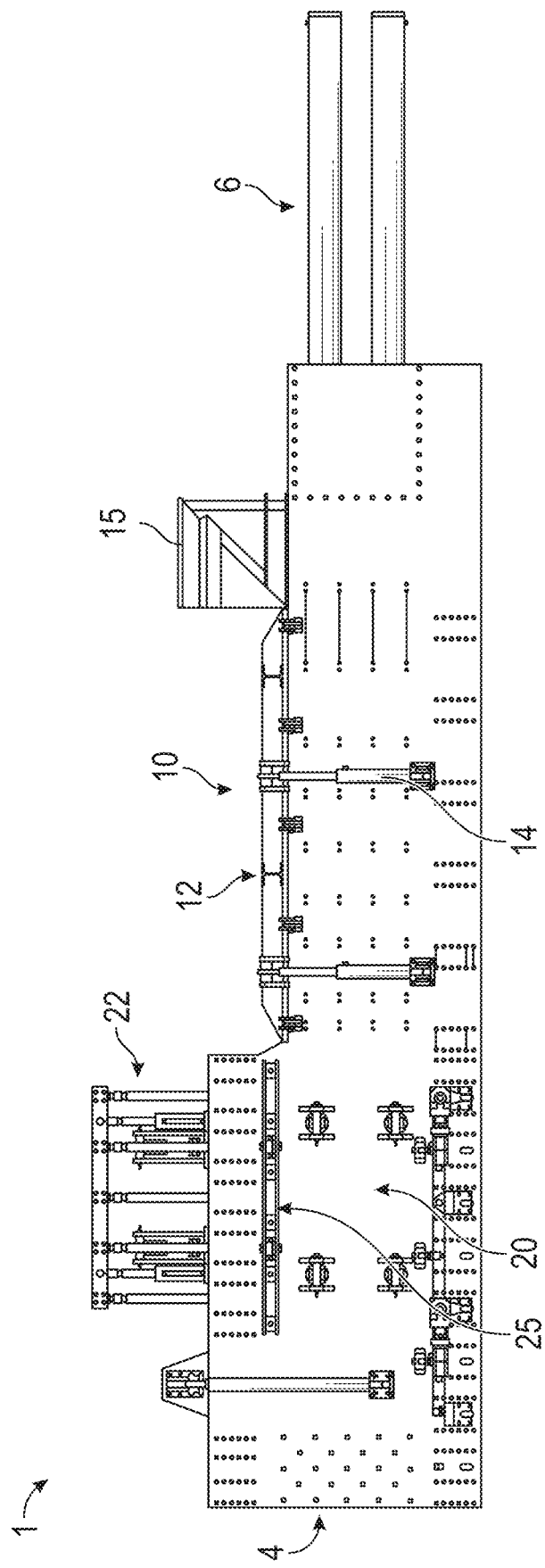
FIG. 2 is a side view of the block extrusion press machine of FIG. 1.
Figure 3:
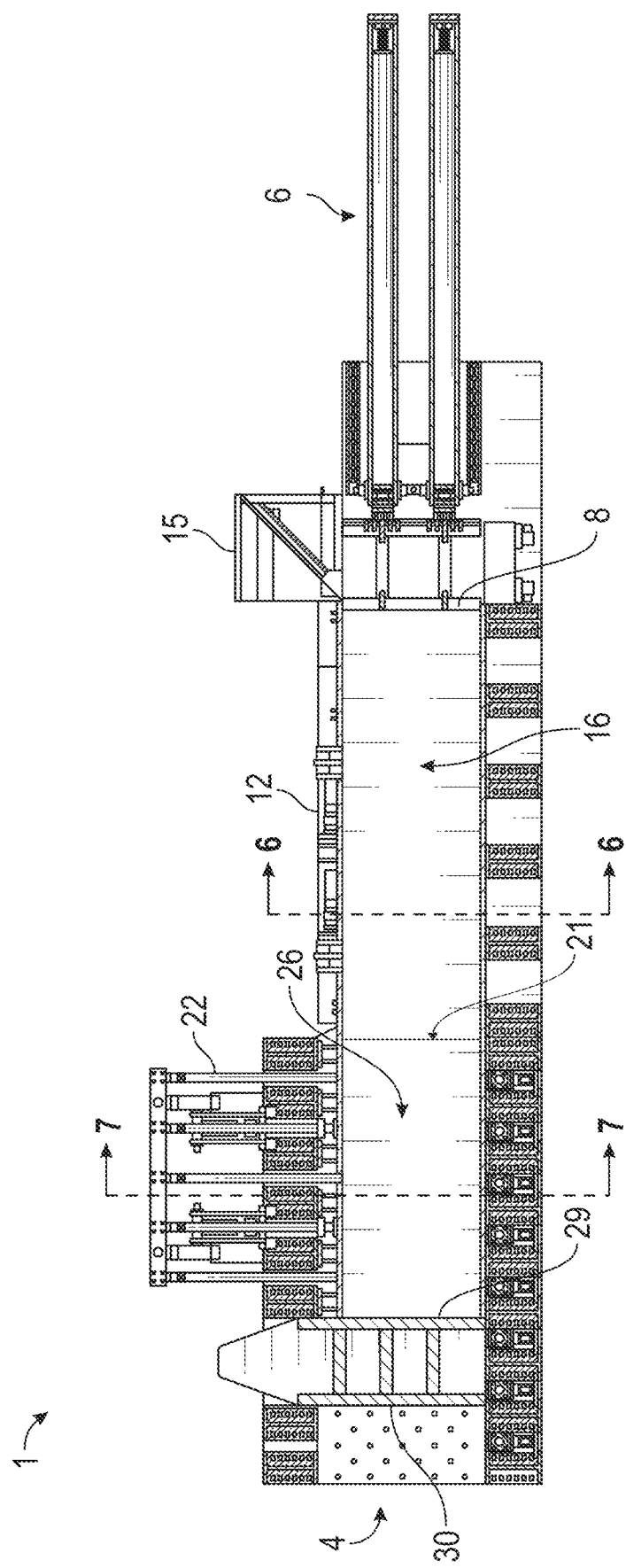
FIG. 3 is a cross-sectional view of the block extrusion press machine of FIG. 1 along line 3-3 in FIG. 4.
Figure 4:
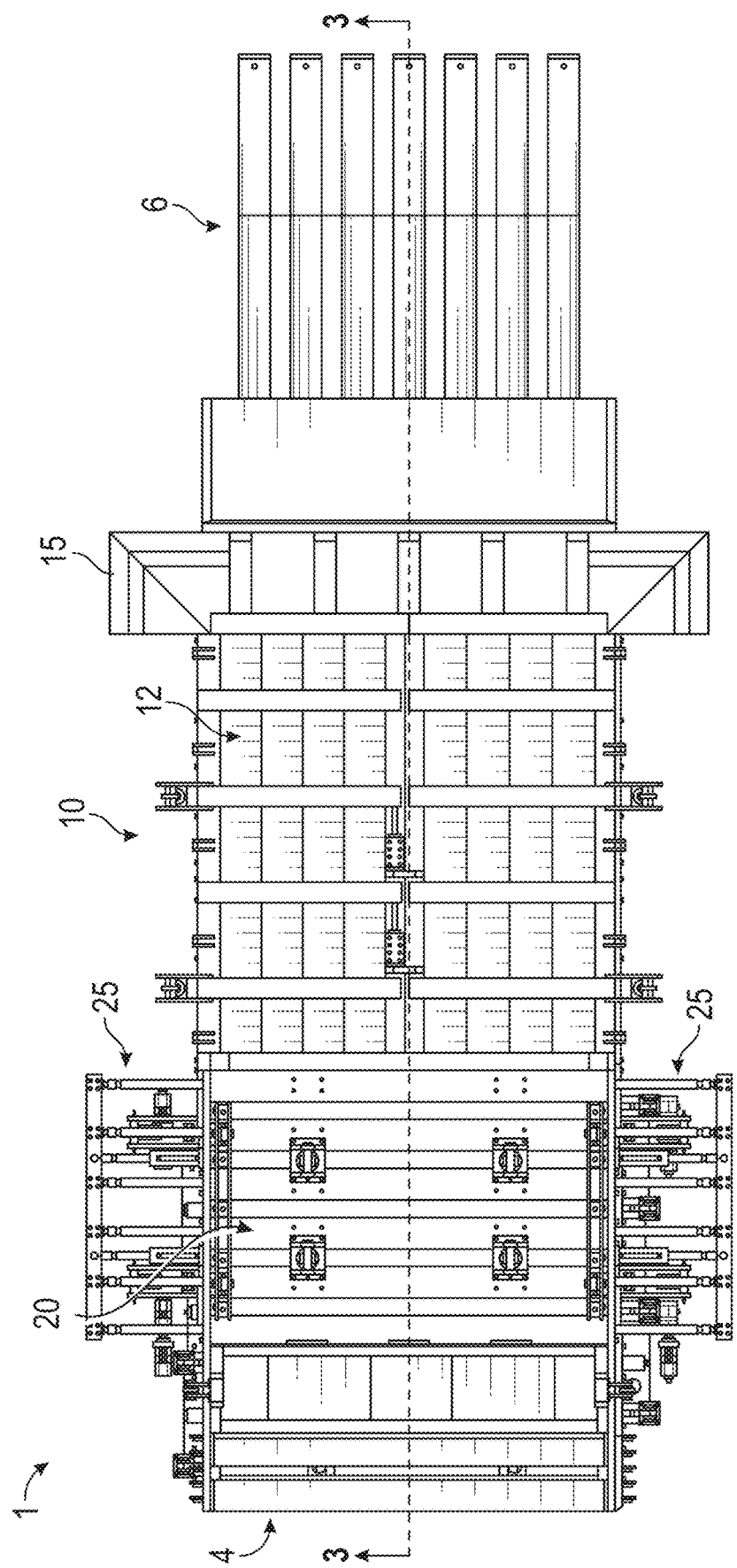
FIG. 4 is a top view of the block extrusion press machine of FIG. 1.
Figure 5:
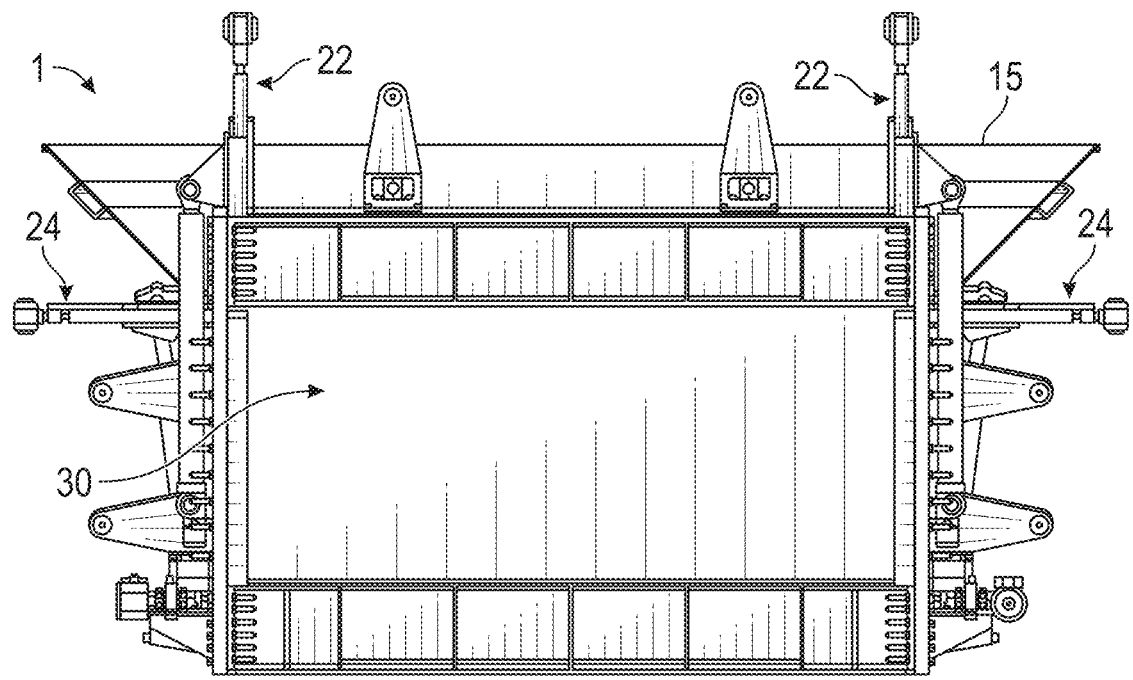
FIG. 5 is an end view of the block extrusion press machine of FIG. 1.
Figure 6:
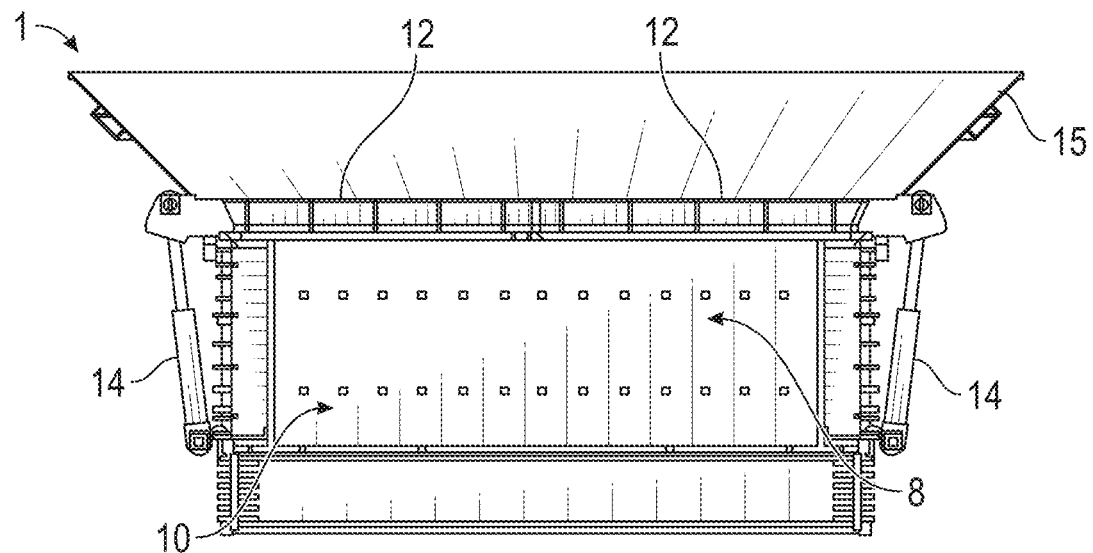
FIG. 6 is a cross-sectional view of the block extrusion press machine of FIG. 1 along line 6-6 in FIG. 3.

With reference to FIG. 3, the extrusion press machine 1 has one or more (e.g., a plurality of) pistons 6 coupled to a pressing wall 8. The piston(s) 6 can be operated (e.g., hydraulically, pneumatically) to move the pressing wall 8 between a first position (shown in FIG. 3) generally aligned with the hopper 15, along a length of the receiving chamber 10, and to a second position inside a compaction chamber 20 of the extrusion press machine 1, as further discussed below.

With continued reference to FIG. 3, the compaction chamber 20 of the extrusion press machine 1 is communication with (e.g., aligned, in line with) the receiving chamber 10. The compaction chamber 20 extends from a proximal open end 21 to a distal end 29. The distal end 29 can be closed by a gate 30 when the gate 30 is in the closed position. The gate 30 can move orthogonally (e.g., vertically) to a longitudinal axis of the extrusion press machine 1 between an open position that opens the distal end 29 of the compaction chamber 20 and a closed position that closes the distal end 29 of the compaction chamber 20.

Figure 7:
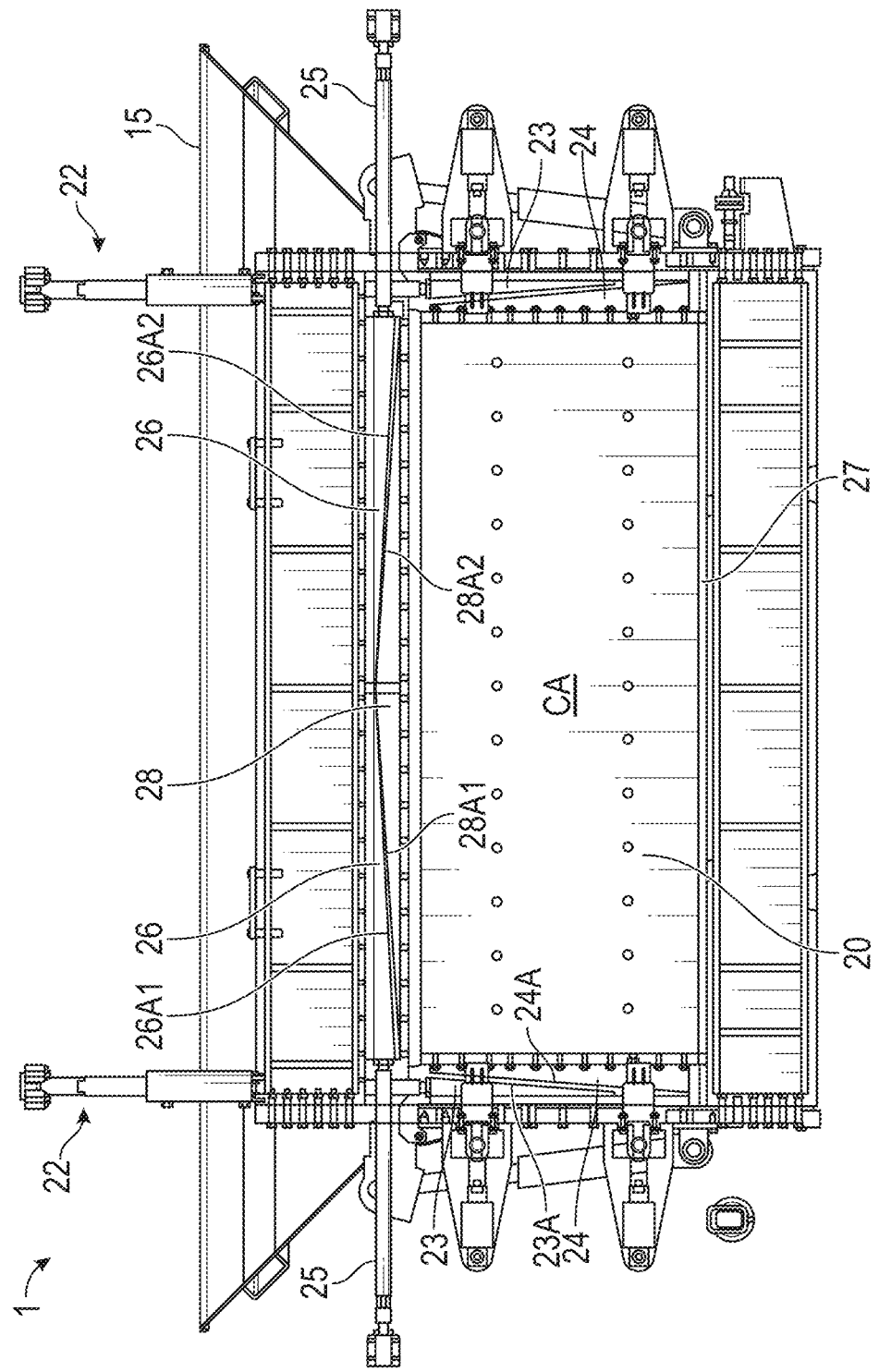
FIG. 7 is a cross-sectional view of the block extrusion press machine of FIG. 1 along line 7-7 in FIG. 3
Figure 8:
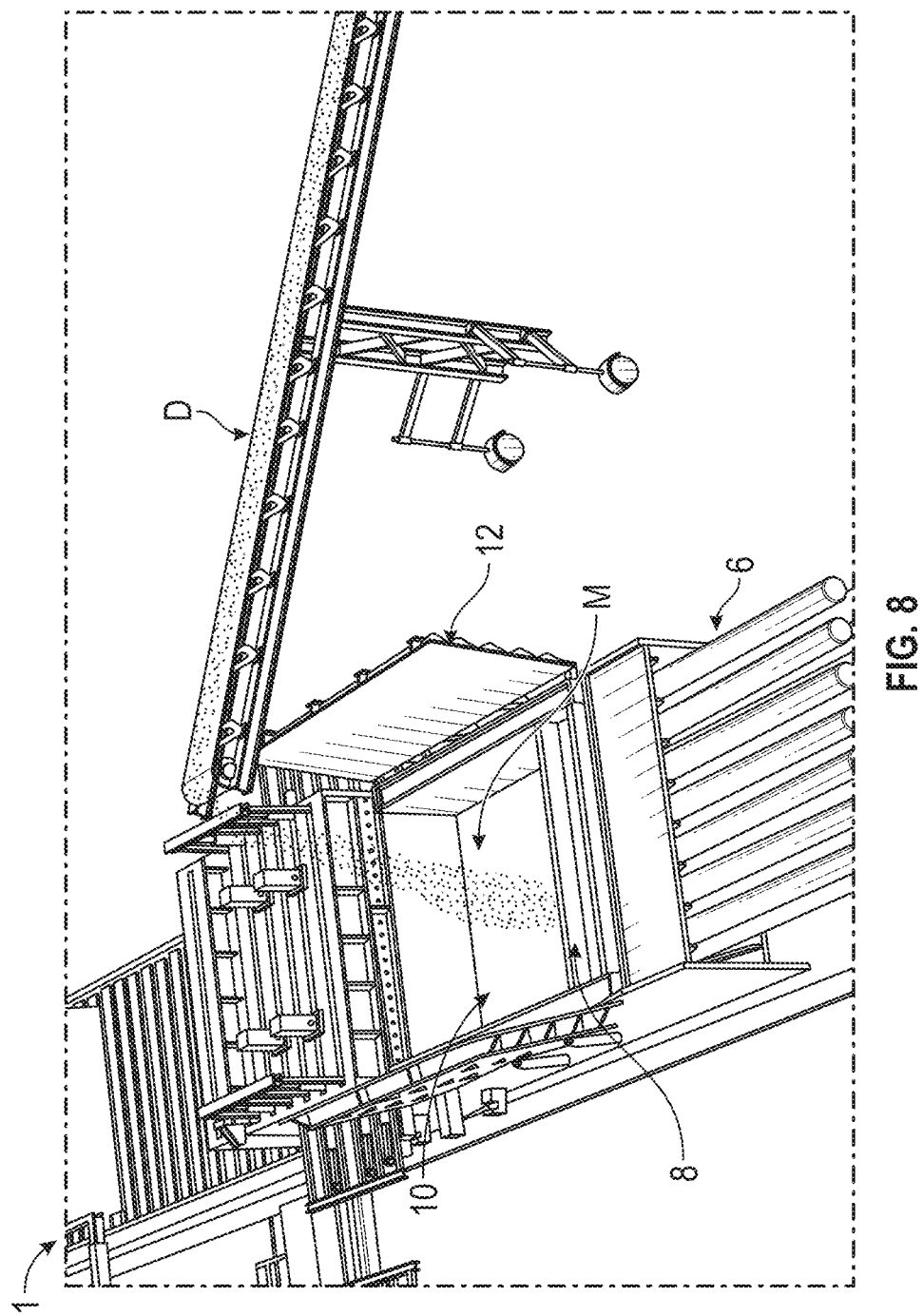
FIG. 8 is a partial perspective view of a block extrusion press machine receiving material for forming a block.

The compaction chamber 20 is defined between the gate 30, when in the closed position, a pair of opposite side walls 24, a top wall 28, a base wall 27 (or a plate P positioned on the base wall 27) and the pressing wall 8. With reference to FIG. 7, each of the pair of opposite sidewalls 24 can be actuated to move toward or away from a center CA of the compaction chamber 20 by respective movable walls 23 coupled to pistons 22. Each of the opposite sidewalls 24 has a tapered edge 24A (angled or conical edge) that engages (e.g., in a sliding manner, slidably engages) a tapered edge 23A (angled or conical edge) of its corresponding movable walls 23. As seen in FIG. 7, each of the pair of opposite sidewalls 24 and its corresponding movable wall 23 have a triangular shape with tapered (or angled) edges 24A, 23A that face and frictionally engage each other. The tapered edge 24A of each of the pair of opposite sidewalls 24 are on an opposite side from a contact surface of each of the pair of opposite sidewalls 24 that contact the material M when in the compaction chamber 20. The pistons 22 can move the movable walls 23 in a direction orthogonal (e.g., perpendicular) to the direction of motion of the pair of opposite sidewalls 24, which advantageously allows the use of smaller pistons 22 since the pistons 22 do not need to withstand or counteract the hydrostatic force of the material M being compacted, thereby reducing the complexity and cost of the extrusion press machine 1. When the material M is compacted in the compaction chamber and is pressed against the pair of opposite sidewalls 24, the tapered edges 24A of the pair of opposite sidewalls 24 frictionally engage the tapered edges 23A of the movable walls 23. The angle (e.g., friction angle) of the tapered edges 24A, 23A is small (e.g., 2-20 degrees, such as 5 degrees) so that the (hydrostatic) force applied by the material M on the pair of opposite sidewalls 24 during compaction does not move the pistons 22 (or moves the pistons 22 by an insubstantial amount). Advantageously, this allows the pistons 22 to be smaller, less complex and less costly.

The top wall 28 has two opposite tapered (angled, conical) edges 28A1, 28A2 on an opposite side from a contact surface of the top wall 28 that contacts the material M when in the compaction chamber 20. The two opposite tapered edges 28A1, 28A2 of the top wall 28 engage (e.g., in a sliding manner, slidably engages) corresponding tapered edges 26A1, 26A2 (angled or conical edges) of two movable walls 26 that are coupled to and actuated by pistons 25. As seen in FIG. 7, the movable walls 26 have a triangular shape with tapered (or angled) edges that face corresponding triangular shaped portions (or angled portions) of the top wall 28. The pistons 25 can move the movable walls 26 in a direction orthogonal (e.g., perpendicular) to the direction of motion of the top wall 28, which advantageously allows the use of smaller pistons 25 since the pistons 25 do not need to withstand or counteract the hydrostatic force of the material M being compacted, thereby reducing the complexity and cost of the extrusion press machine 1. When the material M is compacted in the compaction chamber and is pressed against the top wall 28, the tapered edges 28A1, 28A2 of the top wall 28 frictionally engage the tapered edges 26A1, 26A2 of the movable walls 26. The angle (e.g., friction angle) of the tapered edges 28A1, 26A1, 28A2, 26A2 is small (e.g., 2-20 degrees, such as 5 degrees) so that the (hydrostatic) force applied by the material M on the top wall 28 during compaction does not move the pistons 25 (or moves the pistons 25 by an insubstantial amount). Advantageously, this allows the pistons 25 to be smaller, less complex and less costly.

Figure 10:
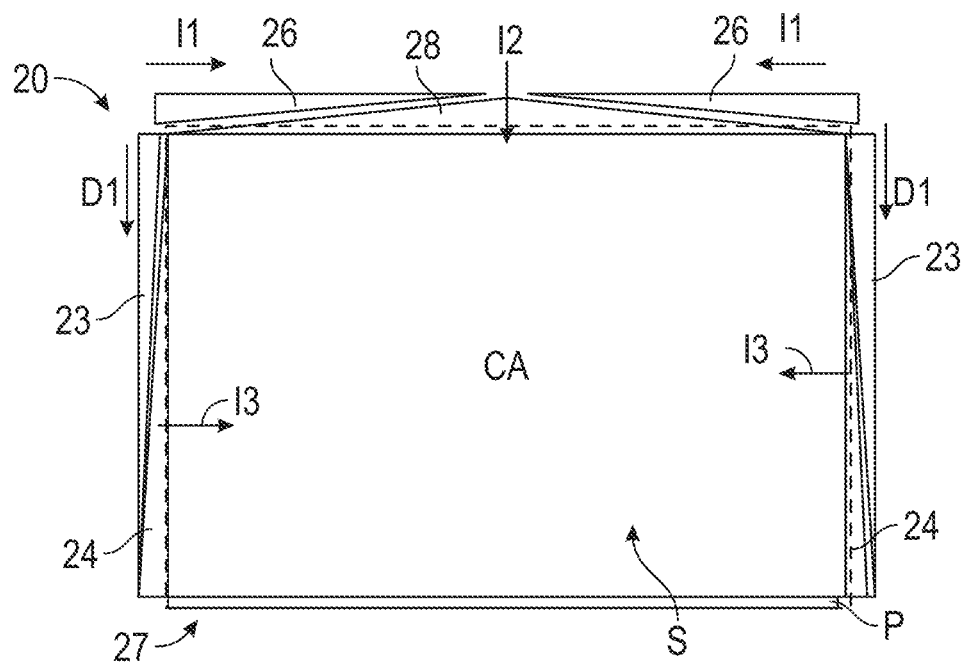
FIG. 10 is a schematic view of a compaction chamber of the block extrusion press machine of FIG. 1 in a widthwise direction of the machine in one operating position.
Figure 11:
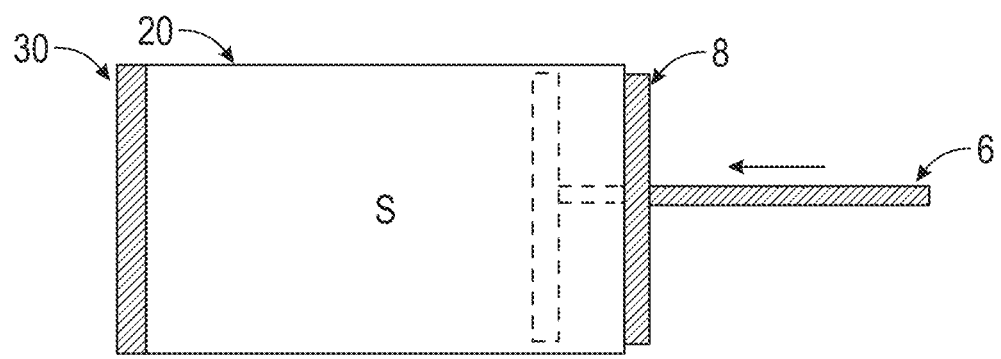
FIG. 11 is a schematic view of the compaction chamber of the block extrusion press machine of FIG. 1 in a lengthwise direction of the machine in one operating position.

FIG. 10 schematically illustrates the compaction chamber 20 to illustrate the movement of the top wall 28 and pair of opposite sidewalls 24. The dashed line is not a physical boundary but included to show the relative movement of the top wall 28 and the pair of opposite side walls 24 in FIGS. 10 and 12. For example, prior to actuating the piston(s) 6 to move the pressing wall 8 into the compaction chamber 20, the top wall 28 can be moved in a direction I2 toward the center CA of the compaction chamber 20 by moving (via the pistons 25) the movable walls 26 in a second direction I1 orthogonal to the direction I2. Similarly, the pair of opposite sidewalls 24 can be moved in a direction I3 toward the center CA of the compaction chamber 20 by moving (via the pistons 22) the movable walls 23 in a direction D1 orthogonal to the direction I3. In this manner, the top wall 28 and the pair of opposite side walls 24, along with the base wall 27 (or plate P disposed on the base wall 27), define the space S (e.g., rectangular cross-section) in the compaction chamber 20 that is approximately the same size as the pressing wall 18. The space S slidingly receives the pressing wall 8 (actuated by the piston(s) 6, as shown in FIG. 11) that pushes the material M into the space S in the compaction chamber 20 to compact the material M (by pressing it against the gate 30, top wall 28, the pair of opposite sidewalls 24 and the plate P) to form the block B. Such compaction of the material M causes plastic deformation of the material. However, the material has elastic qualities so that the formed block B will have some amount of elasticity once formed.

Figure 12:
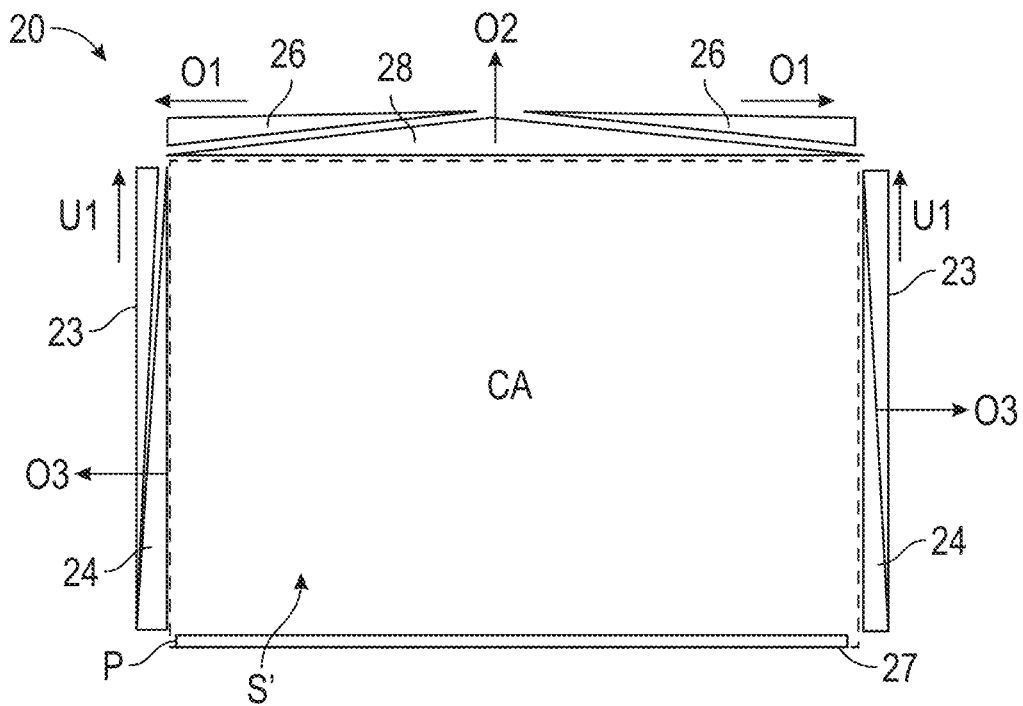
FIG. 12 is a schematic view of a compaction chamber of the block extrusion press machine of FIG. 1 in a widthwise direction of the machine in another operating position.

FIG. 12 schematically illustrates the compaction chamber 20 to illustrate the movement of the top wall 28 and pair of opposite sidewalls 24. The dashed line is not a physical boundary but included to show the relative movement of the top wall and the pair of opposite side walls 24 in FIGS. 10 and 12.

Following formation of the block B via compaction in the compaction chamber 20, as discussed above, the formed block B is allowed to expand in the compaction chamber 20 by moving one or more of the pair of opposite sidewalls 24 and the top wall 28 (e.g., moving both the pair of opposite sidewalls 24 and the top wall 28) away from the center CA of the compaction chamber 20. For example, the formed block B can be allowed to expand in three dimensions by moving the top wall 28 and the pair of opposite sidewalls 24 away from the center CA of the compaction chamber 20, and by moving the pressing wall 8 away from the gate 30 in order to define a space S' in the compaction chamber 20 that is larger than the space S. In one example, the top wall 28, the pair of opposite side walls 24 and the gate 30 are moved simultaneously. For example, the top wall 28 can be moved in a direction O2 away from the center CA of the compaction chamber 20 by moving (via the pistons 25) the movable walls 26 in a second direction O1 orthogonal to the direction O2. Similarly, the pair of opposite sidewalls 24 can be moved in a direction O3 away from the center CA of the compaction chamber 20 by moving (via the pistons 22) the movable walls 23 in a direction U1 orthogonal to the direction O3. The pressing wall 8 is moved toward the proximal end 2 (e.g., away from the gate 30). In one example, the top wall 28, the pair of opposite side walls 24 and the pressing wall 8 are moved gradually (e.g. at a constant rate) over a period of time or over a distance (e.g., 1 cm), so that as the top wall 28, the pair of opposite side walls 24 and the pressing wall 8 move away from the center CA of the compaction chamber 20, the formed block B remains in contact with the top wall 28, the pair of opposite side walls 24 and the pressing wall 30 as the formed block B elastically expands. As the top wall 28, the pair of opposite side walls 24 and the pressing wall 8 continue to move away from the center CA of the compaction chamber 20 for a period of time or over a distance (e.g., an additional 1 cm), the formed block B stops expanding (e.g., is now an expanded block B) so that the top wall 28, the pair of opposite side walls 24 and the pressing wall 8 become spaced apart from the formed block B (e.g., to define a gap between the formed block B and the top wall 28, the pair of opposite side walls 24 and the pressing wall 8).

Allowing the formed block B to expand in the manner discussed above advantageously allows the formed block B to expand on the plate P (e.g., expand upward, sideways and toward the proximal end 2) and release its elasticity (in a controlled manner). In one example, the top wall 28, pair of opposite sidewalls 24 and the pressing wall 8 can each move away from the center CA of the compaction chamber 20 by about 2 cm in total, wherein during a first portion (e.g., the first 1 cm), the top wall 28, pair of opposite side walls 24 and pressing wall 8 remain in contact with the formed block B as the formed block B elastically expands. Advantageously, this process increases the reliability and lifespan of the formed blocks B and inhibits failure of the block B once it exits the compaction chamber 20 (e.g., inhibits or prevents cracks from forming in the block B, as compared with a block extruded out of a press without releasing its elasticity).

Figure 13:
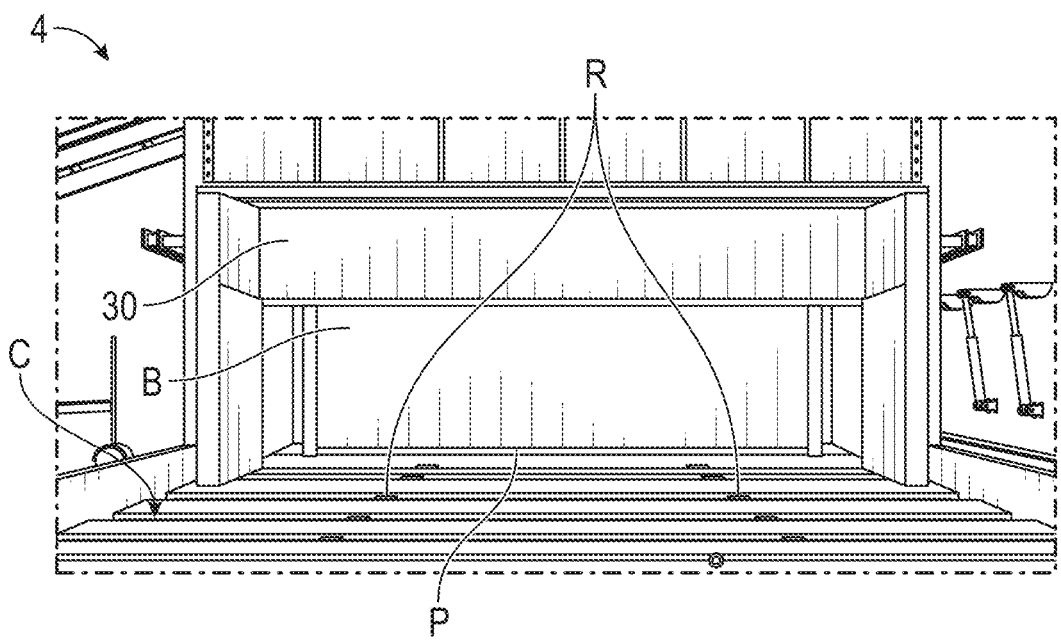
FIG. 13 is a partial end view of a block extrusion press machine, showing operation of the end gate of the machine.
Figure 14:
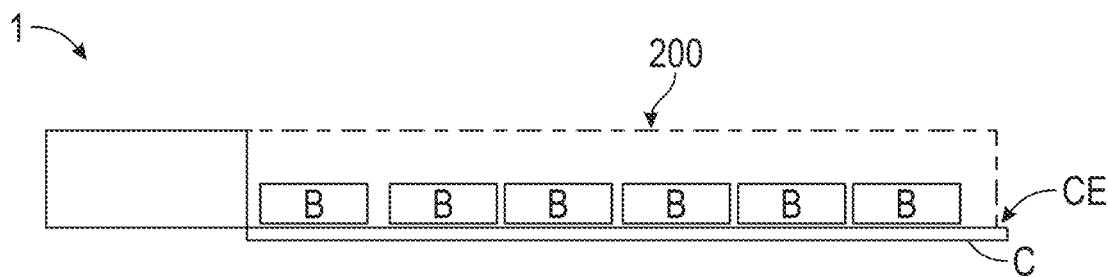
FIG. 14 is a schematic view of a block extrusion press machine and conveyor with an optional cover.

Once the formed block B has been allowed to expand, as noted above, the gate 30 can be opened (see FIG. 13) and the formed and expanded block B can exit the compaction chamber 20 while disposed on the plate P, for example via rollers R outside the compaction chamber 20 that transport the plate P with the formed (expanded) block B thereon and continue onto a conveyor C, also having rollers R, the conveyor C being part of the system 1. As shown in FIG. 14, as blocks B are produced in the extrusion press machine 1, they can continue onto the conveyor C one by one. The conveyor C can support multiple blocks B (e.g., 20, 30, 40, 50, 60, 70, etc.), the blocks B moving (via the rollers R on the conveyor C) toward the distal end CE of the conveyor C as each new block B is produced. The blocks B can cure while on the conveyor C. Preferably, the conveyor C has a length sufficient to allow each blocks B to cure once it reaches the distal end CE of the conveyor C.

In one example, shown in FIG. 14, a cover 200 can be disposed over the conveyor C (e.g. extend along an entire length of the conveyor C) to shelter the formed (expanded)

blocks B as they travel along the conveyor C to the distal end CE of the conveyor C. The cover 200 can form a chute over the conveyor C The cover 200 is shown with a broken line for illustration purposes only to contrast with the rest of the components in FIG. 14; the cover 200 can be solid (without any openings or apertures on upper and side surfaces). For example, the cover 200 can protect the blocks B from the sun, advantageously inhibiting (e.g., preventing) temperature gradients in the blocks B that can generate stresses in the blocks B that can make the blocks B more fragile and less compacted. In another example, the cover 200 can provide a controlled environment (e.g., temperature control and/or humidity control), based on the material M of the blocks B, to facilitate the curing process of the blocks B as they move along the conveyor C of the distal end CE of the conveyor C. In one example, the cover 200 can include misters or sprays that deliver sprays of water to increase a humidity level the blocks B experience as they move to the distal end CE of the conveyor C. In another example, the cover 200 can include heaters that direct heat to the blocks B as they move along the conveyor C (e.g., if in a cold environment). In another example, the cover 200 can provide heat and increase humidity the blocks B are exposed to as they move along the conveyor C (e.g., for blocks made of cement).

Figure 15:
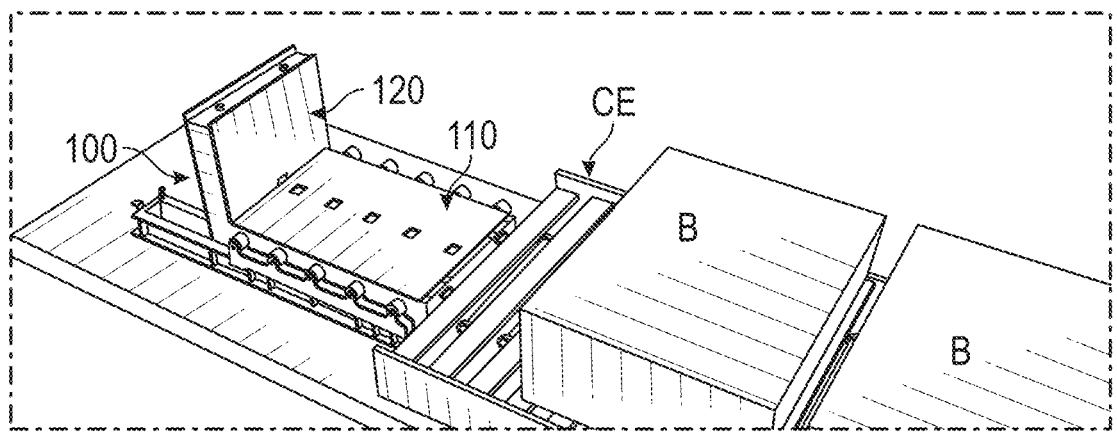
FIG. 15 is a schematic perspective view of an end of a conveyor conveying blocks and a tilt machine at the end of the conveyor.
Figure 16:
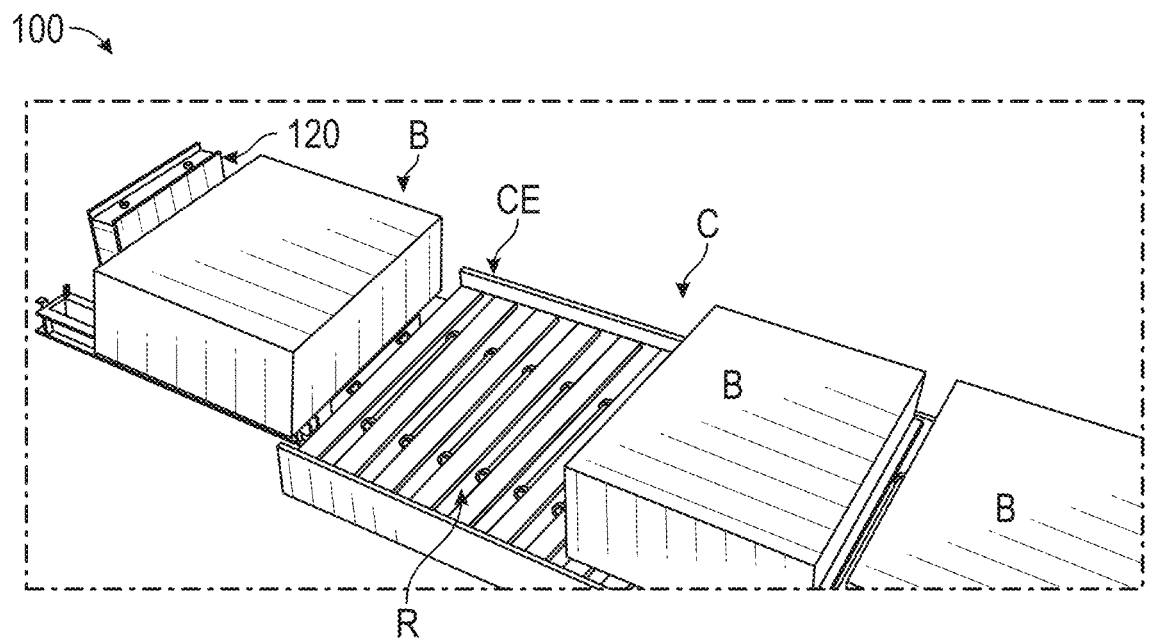
FIG. 16 is a schematic perspective view of the end of a conveyor in FIG. 15 after a block has been moved onto the tilt machine.
Figure 17:
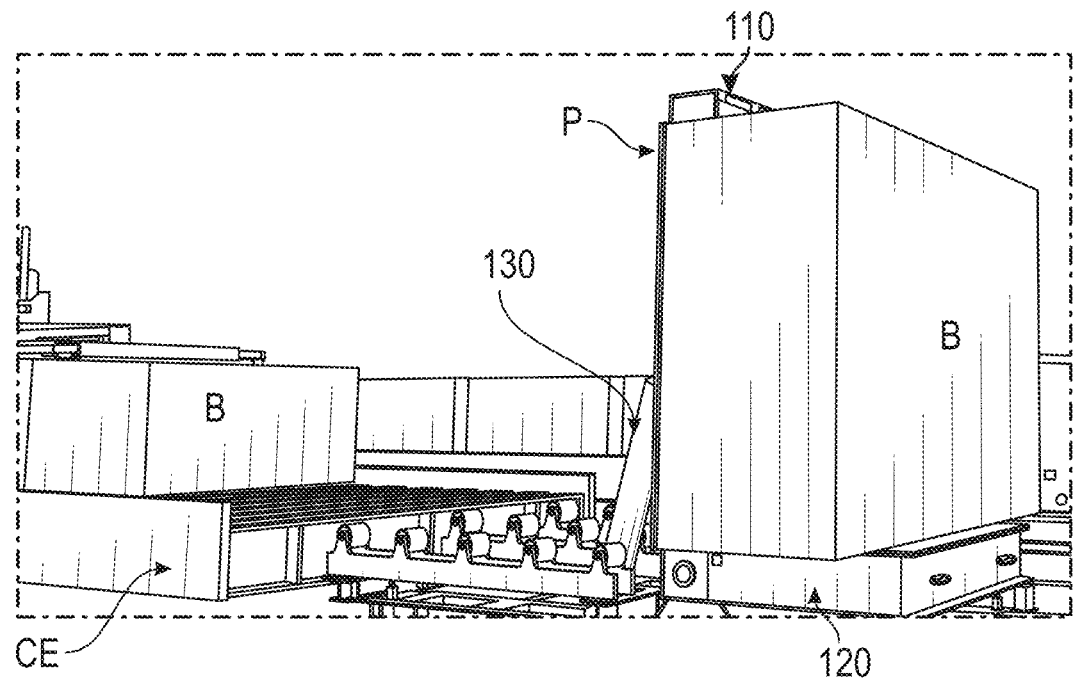
FIG. 17 is a schematic perspective view of an end of a conveyor in FIG. 15 after a block has been moved onto the tilt machine and moved to an upright orientation.

With reference to FIGS. 15-17, once the block B reaches the distal end CE of the conveyor C, it can be transferred to a tilting machine 100 having a first support surface 110 aligned with the conveyor C (see FIG. 15) and a second support surface 120 orthogonal to the first support surface 110. The tilting machine 100 can receive the blocks B one by one and move them (e.g., tilt them) via a piston 130 from a first orientation (see FIG. 16) and a second orientation (see FIG. 17) orthogonal to the first orientation. The block B can then be lifted (e.g., by a forklift) from the tilting machine 100 when in the second orientation and the plate P returned to the extrusion press machine 1 for use in forming a block B in the compaction chamber 20.

Figure 18A:
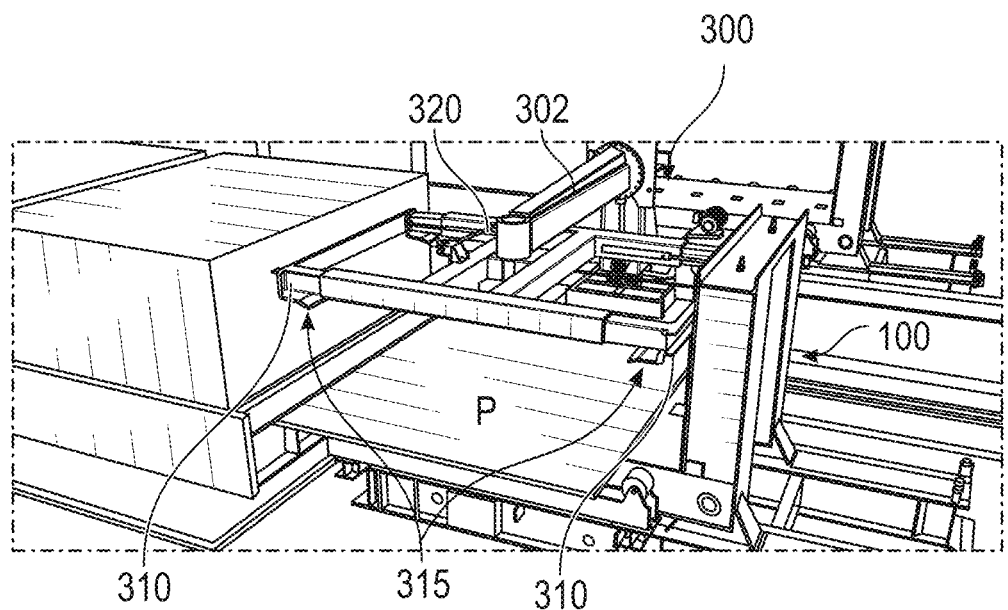
FIG. 18A is a partial schematic perspective view of a plate carrying machine positioned over the tilt machine adjacent the end of the conveyor to remove a plate from the tilt machine.
Figure 18B:
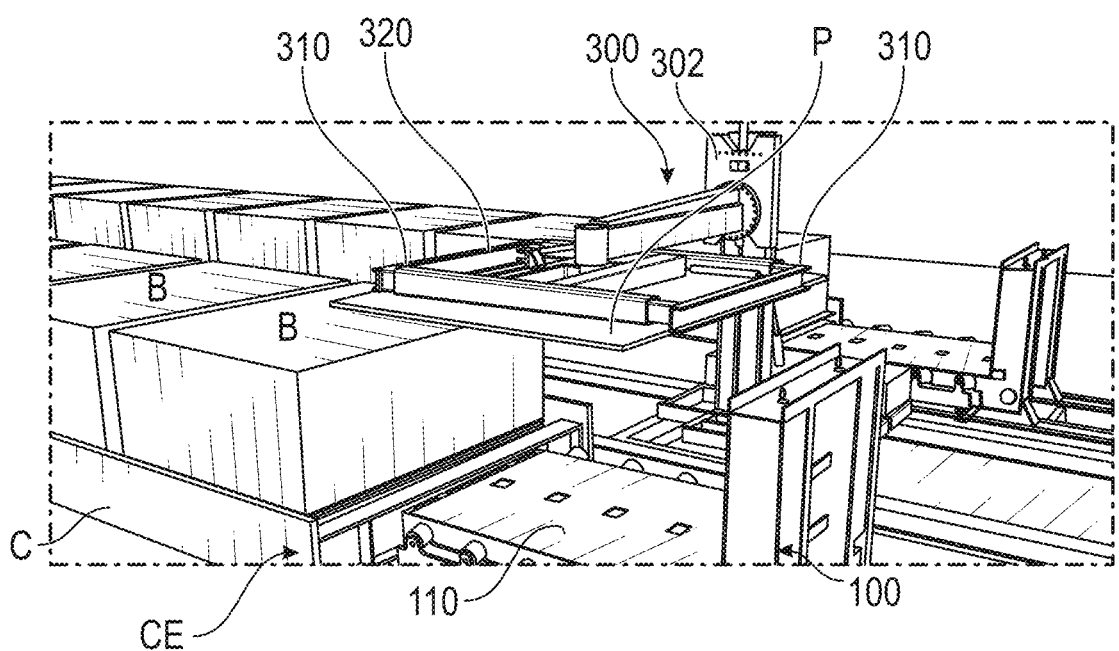
FIG. 18B is a partial schematic perspective view of the plate carrying machine of FIG. 18A coupled to a plate removed from over the tilt machine adjacent the end of conveyor.

FIGS. 18A-22 show a plate carrying machine 300 having a support arm 302, a frame 320 and two coupling arms 310 with brackets (e.g., C-shaped brackets) 315 that can be operated to couple to and move a plate P (e.g., from the tilting machine 100 once the block B has been tilted and removed from the tilting machine 100 and the tilting machine 100 is moved back to the first orientation (see FIG. 18A). The plate carrying machine 300 can position the coupling arms 310 over the plate P, and the support arm 302 vertically move the frame 320 and coupling arms 310 toward the plate P. With reference to FIG. 18B, the plate carrying machine 300 can couple to opposite edges of the plate P with the brackets 315 (e.g., by having the opposite edges of the plate extend into the slot in the bracket 315), allowing the support arm 302 to raise the plate P off the tilting machine 100. Additionally, the plate carrying machine 300 can clean the plate P (e.g., clean the block interfacing surface), such as with one or more brushes, as the plate carrying machine 300 carries the plate P.

Figure 19:
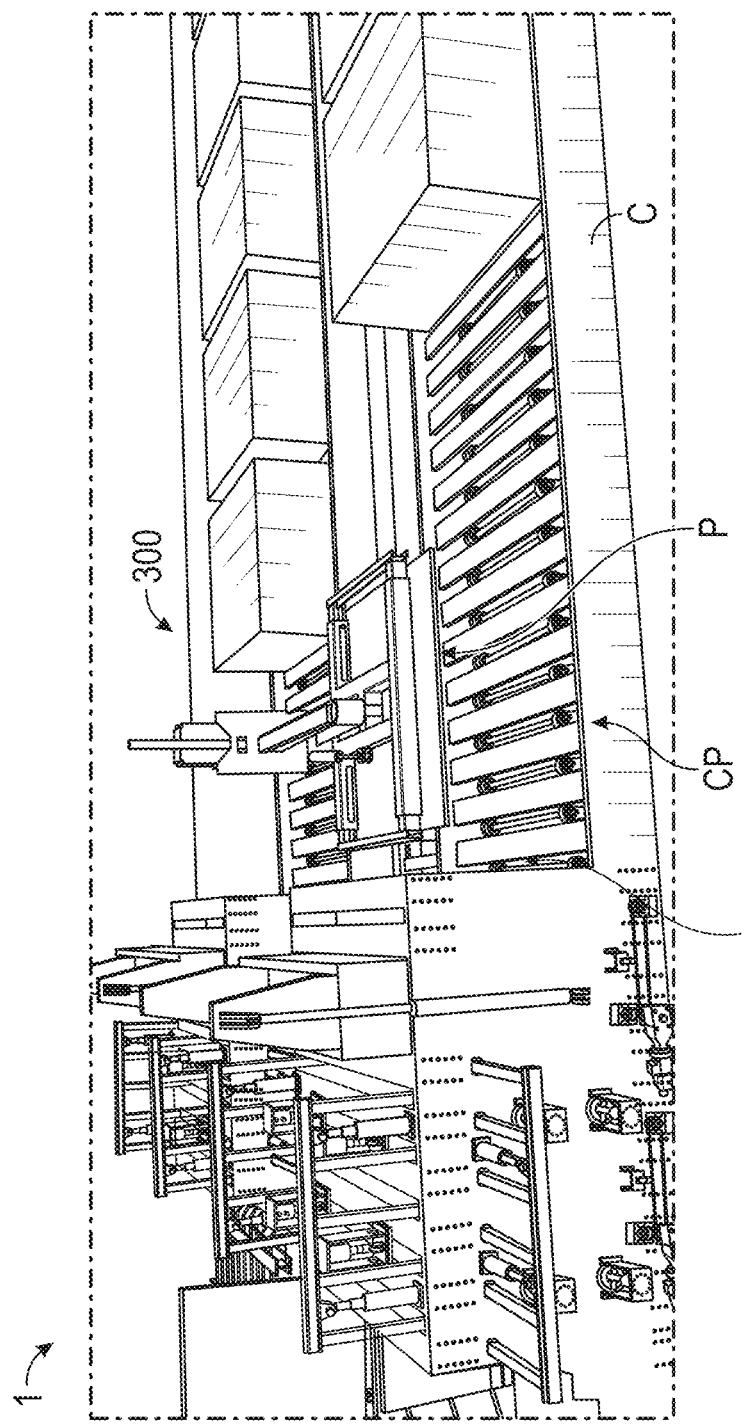
FIG. 19 is a partial schematic perspective view of the plate carrying machine of FIG. 18A coupled to the plate and having moved to a position proximate and the distal end of the block extrusion press machine.
Figure 20:
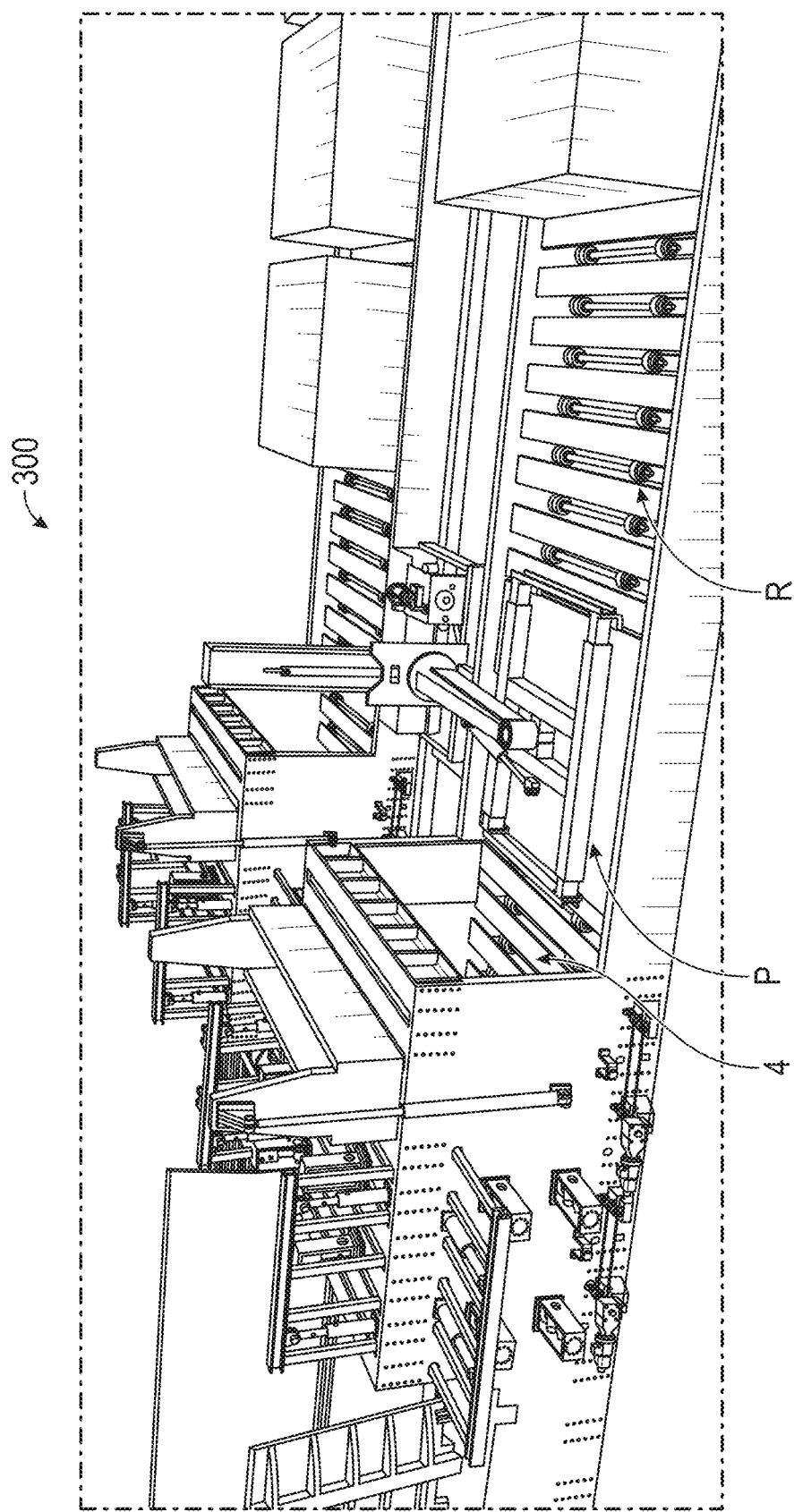
FIG. 20 is a partial schematic perspective view of the plate carrying machine of FIG. 18A once it has delivered the plate to a position on the conveyor proximate the distal end of the block extrusion press machine.
Figure 21:
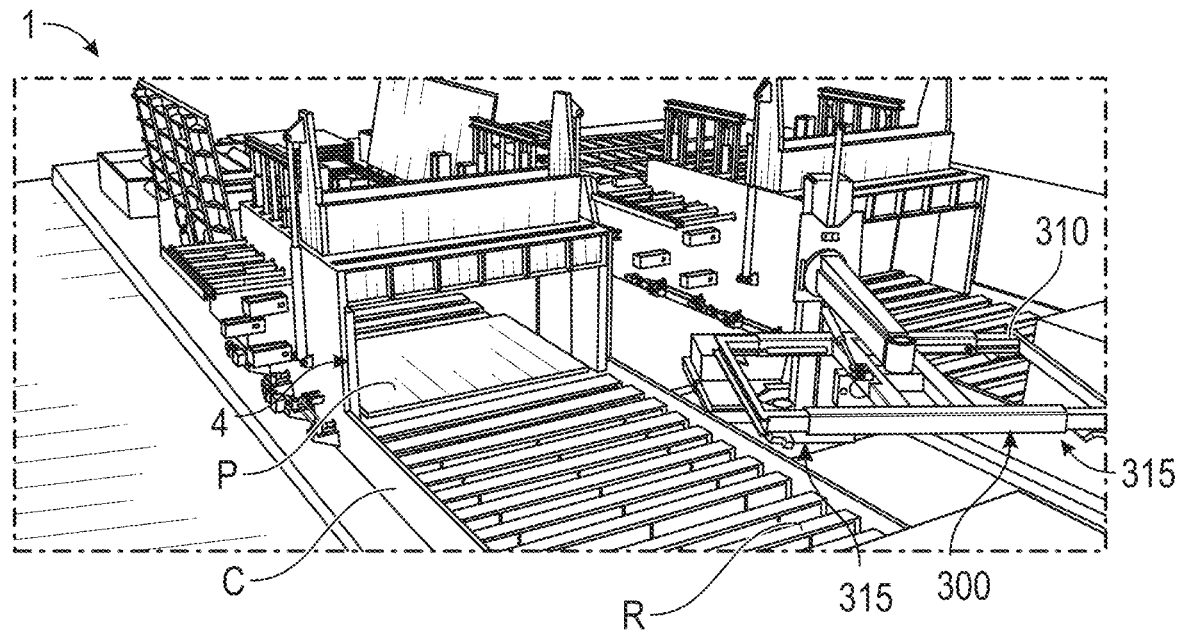
FIG. 21 is a partial schematic perspective view of the plate moving into the compaction chamber of the block extrusion press machine, with the gate in the open position.
Figure 22:
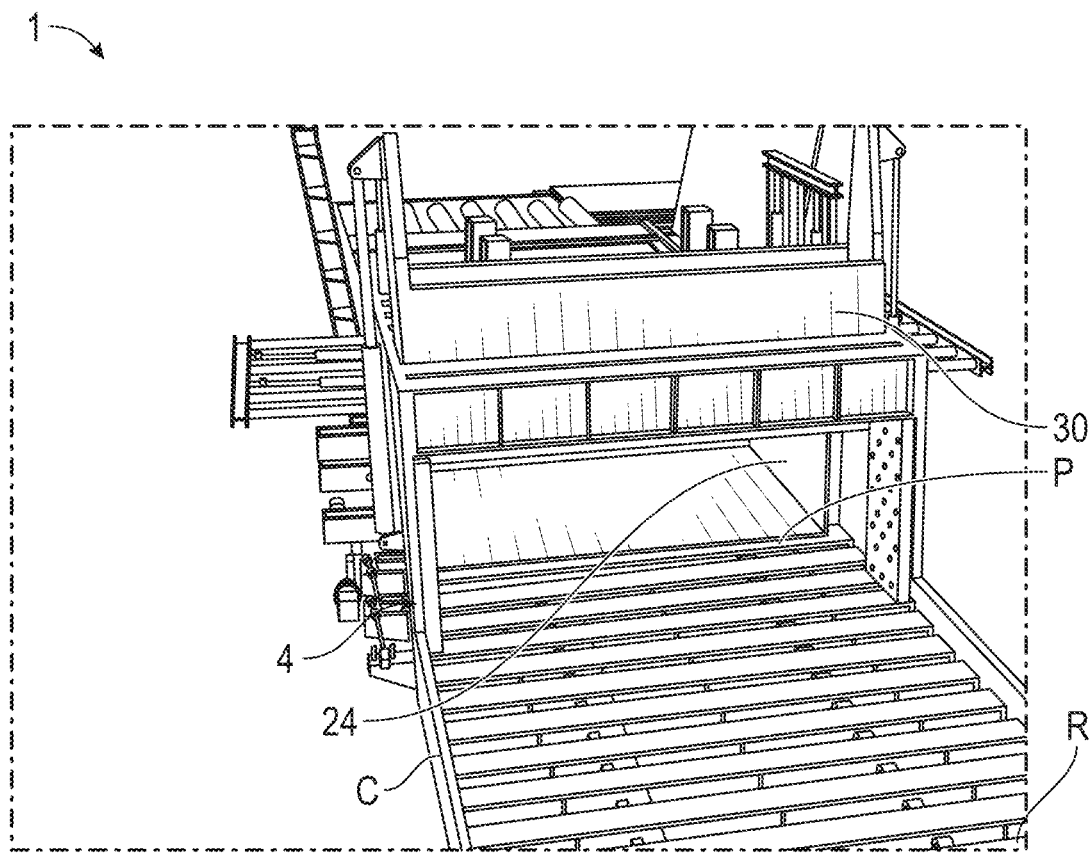
FIG. 22 is a partial schematic perspective view of the plate once positioned in the compaction chamber of the block extrusion press machine, with the gate in the open position.

As shown in FIGS. 19-20, the plate carrying machine 300 can travel from the distal end CE of the conveyor C to the proximal end CP of the conveyor C proximate the distal end 4 of the block extrusion machine 1. The support arm 302 can lower the plate P (e.g., after it has been cleaned) onto the proximal end CP of the conveyor C and actuate the coupling arms 310 to release the plate P so that the plate P exits the slots in the brackets 315 of the coupling arms 310. Advantageously, this allows the plate to be reused P to support another block B. FIG. 21 shows the plate P being moved (by the rollers R) into the compaction chamber 20, and FIG. 22 shows the plate P arriving in the compaction chamber 20 and aligned with the pair of opposite sidewalls 24.

The extrusion press machine 1 can be made of metal (e.g., steel). For example, the receiving chamber 10, doors 12, pressing wall 8, compaction chamber 20, top wall 28, opposite side walls 24, base wall 27, and gate 30 can all be made of steel. Additionally, the movable walls 23, 26 can be made of steel.

One or more (e.g., all) of the pistons described herein, such as one or more (e.g., all) of the piston(s) 6, pistons 14 pistons 22, pistons 25 and piston 130 can be hydraulically actuated. In another example, one or more (e.g., all) of the pistons described herein, such as one or more (e.g., all) of the piston(s) 6, pistons 14 pistons 22, pistons 25 and piston 130 can be pneumatically operated.

Additional Embodiments

In embodiments of the present invention, a system and method for making a block for gravity energy storage may be in accordance with any of the following clauses:

Clause 1. A system for making blocks for gravity energy storage, comprising: an extrusion press machine comprising a receiving chamber configured to receive material for forming a block, a compaction chamber in communication with the receiving chamber, the compaction chamber including a base, a pair of opposite sidewalls and a top wall, a gate operable to open or close a distal end of the compaction chamber, and a piston actuatable to slidably move a pressing wall across the receiving chamber and into the compaction chamber with the gate in a closed position to press the material into contact with the gate, the pair of opposite sidewalls, the top wall, the pressing wall and a plate positioned on a base wall of the compaction chamber in order to compact the material within the compaction chamber to form a block, wherein one or more of the pair of opposite sidewalls, the top wall and the pressing wall are operable to move away from a center of the compaction chamber to allow the block to elastically expand to an expanded position while positioned on the plate and prior to exiting from the compaction chamber, and wherein the gate is operable to open the distal end of the compaction chamber to allow the block in the expanded position to exit the compaction chamber.

Clause 2. The system of Clause 1, wherein the pair of opposite sidewalls, the top wall and the pressing wall are all operable to simultaneously move away from a center of the compaction chamber to allow the formed block to elastically expand in three dimensions while positioned on the plate.

Clause 3. The system of any preceding clause, wherein the material comprises dirt and one or more additives or binding agents.

Clause 4. The system of any preceding clause, wherein the piston is a plurality of pistons.

Clause 5. The system of any preceding clause, wherein the pair of opposite sidewalls each comprise a first tapered edge and a movable plate having a second tapered edge facing the first tapered edge and movably engaging each of the pair of opposite sidewalls, the movable plate operable to move in a first direction to cause each of the pair of opposite sidewalls to move toward a center of the compaction chamber, the movable plate operable to move in a second direction opposite the first direction to cause each of the pair of opposite sidewalls to move away from the center of the compaction chamber.

Clause 6. The system of Clause 5, wherein the movable plate is coupled to a piston operable to move the movable plate in a direction orthogonal to a direction of motion of each of the opposite sidewalls.

Clause 7. The system of Clause 5, wherein each of the pair of opposite sidewalls is configured to move out of contact with the formed block when moved away from the center of the compaction chamber.

Clause 8. The system of any preceding clause, wherein the top wall comprises a third tapered edge and a fourth tapered edge, a first movable plate having a fifth tapered edge facing the third tapered edge and a second movable plate having a sixth tapered edge facing the fourth tapered edge, the first and second movable plates operable to move in a first direction to cause the top wall to move toward a center of the compaction chamber, the first and second movable plates operable to move in a second direction opposite the first direction to cause the top wall to move away from the center of the compaction chamber.

Clause 9. The system of Clause 8, wherein the first movable plate and the second movable plate are each operatively coupled to a piston operable to move the first movable plate and the second movable plate in a direction orthogonal to a direction of motion of the top wall.

Clause 10. The system of Clause 8, wherein the top wall is configured to move out of contact with the formed block when moved away from the center of the compaction chamber.

Clause 11. The system of any preceding clause, further comprising a conveyor distally of the distal end of the compaction chamber, the conveyor configured to convey the block to a distal end of the conveyor.

Clause 12. The system of Clause 11, further comprising a cover that extends over the conveyor to shelter the block as it is conveyed along a length of the conveyor, the cover configured to protect the block from sunlight and configured to provide a controlled environment to facilitate a curing of the block.

Clause 13. The system of Clause 12, wherein the controlled environment is a temperature controlled environment or humidity controlled environment.

Clause 14. The system of Clause 11, further comprising a tilt machine aligned with a distal end of the conveyor, the tilt machine configured to receive the block while it is positioned on the plate in a first orientation and operable to tilt the block and the plate to a second orientation orthogonal to the first orientation.

Clause 15. The system of Clause 14, wherein the tilt machine is operable by a piston to rotate from a first position aligned with the distal end of the conveyor to a second position orthogonal to the distal end of the conveyor.

Clause 16. The system of Clause 14, further comprising a plate carrying machine configured to couple to the plate once the block has been removed from the tilt machine, to clean the plate and to carry the plate to a proximal end of the conveyor proximate the distal end of the extrusion press machine, so that the plate can be reintroduced into the compaction chamber aligned with the pair of opposite sidewalls.

Clause 17. The system of any preceding clause, wherein the receiving chamber comprises one or more doors operable to move between a first position that exposes an opening into the receiving chamber via which the material is introduced and a second position that closes the opening.

Clause 18. The system of Clause 17, wherein the one or more doors is a pair of doors.

Clause 19. The system of Clause 18, wherein the one or more doors is actuatable between the first position and the second position by one or more pistons.

Clause 20. A system for making blocks for gravity energy storage, comprising: an extrusion press machine comprising a receiving chamber configured to receive material for forming a block, a compaction chamber in communication with the receiving chamber, the compaction chamber including a base, a pair of opposite sidewalls and a top wall, a gate operable to open or close a distal end of the compaction chamber, a piston actuatable to slidably move a pressing wall across the receiving chamber and into the compaction chamber with the gate in a closed position to press the material into contact with the gate, the pair of opposite sidewalls, the top wall and the pressing wall to compact the material within the compaction chamber to form a block, and means for moving the pair of opposite sidewalls and the top wall toward or away from a center of the compaction chamber to allow the formed block to elastically expand prior to exiting the compaction chamber.

Clause 21. A method of making a block for gravity energy storage, comprising: at least partially filling a receiving chamber of an extrusion press machine with material comprising dirt and one or more additives or binding agents; moving the material with a pressing wall into a compaction chamber of the extrusion press machine; compacting the material within the compaction chamber between a gate, a pair of opposite sidewalls, a top wall and the pressing wall to form the block; moving the pair of opposite sidewalls, the top wall and the pressing wall away from a center of the compaction chamber to allow the formed block to elastically expand in size in three dimensions; and moving the gate to open a distal end of the compaction chamber to allow the expanded block to exit the extrusion press machine.

Clause 22. The method of Clause 21, further comprising moving the pair of opposite sidewalls and the top wall toward the center of the compaction chamber prior to moving the material with the pressing wall into the compaction chamber.

Clause 23. The method of any of Clauses 21-22, further comprising moving the pressing wall away from the gate of the compaction chamber simultaneously with moving the pair of opposite side walls and the top wall away from the center to allow the formed block to expand in size.

Clause 24. The method of any of Clauses 21-23, further comprising conveying the expanded block along a conveyor in communication with the distal end of the compaction chamber to a distal end of the conveyor to allow the expanded block to cure.

Clause 25. The method of Clause 24, further comprising moving the expanded block from a first orientation to a second orientation orthogonal to the first orientation proximate the distal end of the conveyor.

Clause 26. The method of Clause 24, further comprising moving a plate on which the expanded block is conveyed to a proximal end of the conveyor to reuse the plate in the compaction chamber.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. A system for making blocks for gravity energy storage, comprising:
an extrusion press machine, comprising:
a receiving chamber configured to receive material for forming a block,
a compaction chamber in communication with the receiving chamber, the compaction chamber including a base, a pair of opposite sidewalls and a top wall,
a gate operable to open or close a distal end of the compaction chamber, and
a piston actuatable to slidably move a pressing wall across the receiving chamber and into the compaction chamber with the gate in a closed position to press the material into contact with the gate, the pair of opposite sidewalls, the top wall, the pressing wall and a plate positioned on a base wall of the compaction chamber in order to compact the material within the compaction chamber to form the block,
wherein one or more of the pair of opposite sidewalls, the top wall and the pressing wall are operable to move away from a center of the compaction chamber to allow the block to elastically expand to an expanded position while positioned on the plate and prior to exiting from the compaction chamber,
wherein the gate is operable to open the distal end of the compaction chamber to allow the block in the expanded position to exit the compaction chamber,
wherein the pair of opposite sidewalls each comprise a first tapered edge and a movable plate having a second tapered edge facing the first tapered edge and movably engaging each of the pair of opposite sidewalls, the movable plate is coupled to a second piston operable to move the movable plate in a direction orthogonal to a direction of each of the pair of opposite sidewalls, the movable plate operable to move in a first direction to cause each of the pair of opposite sidewalls to move toward a center of the compaction chamber, the movable plate operable to move in a second direction opposite the first direction to cause each of the pair of opposite sidewalls to move away from the center of the compaction chamber.

2. The system of claim 1, wherein the pair of opposite sidewalls, the top wall and the pressing wall are all operable to simultaneously move away from the center of the compaction chamber to allow the formed block to elastically expand in three dimensions while positioned on the plate.

3. The system of claim 1, wherein the material comprises dirt and one or more additives or binding agents.

4. The system of claim 1, wherein the piston is a plurality of pistons.

5. The system of claim 1, wherein each of the pair of opposite sidewalls is configured to move out of contact with the formed block when moved away from the center of the compaction chamber.

6. The system of claim 1, wherein the top wall comprises a third tapered edge and a fourth tapered edge, a first movable plate having a fifth tapered edge facing the third tapered edge and a second movable plate having a sixth tapered edge facing the fourth tapered edge, the first and second movable plates operable to move in a first direction to cause the top wall to move toward a center of the compaction chamber, the first and second movable plates operable to move in a second direction opposite the first direction to cause the top wall to move away from the center of the compaction chamber.

7. The system of claim 6, wherein the first movable plate and the second movable plate are each operatively coupled to a third piston operable to move the first movable plate and the second movable plate in a direction orthogonal to a direction of motion of the top wall.

8. The system of claim 6, wherein the top wall is configured to move out of contact with the formed block when moved away from the center of the compaction chamber.

9. The system of claim 1, further comprising a conveyor distally of the distal end of the compaction chamber, the conveyor configured to convey the block to a distal end of the conveyor.

10. The system of claim 9, further comprising a cover that extends over the conveyor to shelter the block as it is conveyed along a length of the conveyor, the cover configured to protect the block from sunlight and configured to provide a controlled environment to facilitate a curing of the block.

11. The system of claim 10, wherein the controlled environment is a temperature controlled environment or humidity controlled environment.

12. The system of claim 9, further comprising a tilt machine aligned with a distal end of the conveyor, the tilt machine configured to receive the block while it is positioned on the plate in a first orientation and operable to tilt the block and the plate to a second orientation orthogonal to the first orientation.

13. The system of claim 12, wherein the tilt machine is operable by a fourth piston to rotate from a first position aligned with the distal end of the conveyor to a second position orthogonal to the distal end of the conveyor.

14. The system of claim 12, further comprising a plate carrying machine configured to couple to the plate once the block has been removed from the tilt machine, to clean the plate and to carry the plate to a proximal end of the conveyor proximate the distal end of the extrusion press machine, so that the plate can be reintroduced into the compaction chamber aligned with the pair of opposite sidewalls.

15. The system of claim 1, wherein the receiving chamber comprises one or more doors operable to move between a first position that exposes an opening into the receiving chamber via which the material is introduced and a second position that closes the opening.

16. The system of claim 15, wherein the one or more doors is a pair of doors.

17. The system of claim 16, wherein the one or more doors is actuatable between the first position and the second position by one or more pistons.

18. A system for making blocks for gravity energy storage, comprising:
an extrusion press machine, comprising:
a receiving chamber configured to receive material for forming a block,
a compaction chamber in communication with the receiving chamber, the compaction chamber including a base, a pair of opposite sidewalls and a top wall,
a gate operable to open or close a distal end of the compaction chamber,
a piston actuatable to slidably move a pressing wall across the receiving chamber and into the compaction chamber with the gate in a closed position to press the material into contact with the gate, the pair of opposite sidewalls, the top wall and the pressing wall to compact the material within the compaction chamber to form a block, and one or more second pistons operable to move the pair of opposite sidewalls and the top wall toward or away from a center of the compaction chamber to allow the formed block to elastically expand prior to exiting the compaction chamber, wherein the pair of opposite sidewalls each comprise a first tapered edge and a movable plate having a second tapered edge facing the first tapered edge and movably engaging each of the pair of opposite sidewalls, the one or more second pistons operable to move the movable plate in a first direction to cause each of the pair of opposite sidewalls to move toward a center of the compaction chamber, the one or more second pistons operable to move the movable plate in a second direction opposite the first direction to cause each of the pair of opposite sidewalls to move away from the center of the compaction chamber.

* * * * *